United States Patent [19]

Manabe et al.

[11] 4,426,233

[45] Jan. 17, 1984

[54] METHOD FOR DISPOSAL OF SLUDGE IN FLOATING ROOF TYPE OIL TANK

[75] Inventors: Nobuyuki Manabe, Fujisawa; Takahiro Goto, Yachiyo, both of Japan

[73] Assignees: Taiho Industries Co. Ltd.; O.P.E. Co. Ltd., both of Tokyo, Japan

[21] Appl. No.: 366,319

[22] Filed: Apr. 7, 1982

[30] Foreign Application Priority Data

Sep. 11, 1981 [JP] Japan ................................ 56-142446
Dec. 28, 1981 [JP] Japan ................................ 56-209734

[51] Int. Cl.$^{3}$ ........................... B08B 5/04; C02F 3/02

[52] U.S. Cl. .................................... 134/21; 134/22.12; 134/22.18; 134/24; 134/88; 210/258; 210/801; 210/803

[58] Field of Search .................... 134/23, 21, 24, 22.1, 134/22.12, 22.18.88, 89; 210/241, 258, 320, 532.1, 801, 802, 803

[56] References Cited

U.S. PATENT DOCUMENTS

| | | | |
|---|---|---|---|
| 3,833,010 | 9/1974 | McDermott et al. | 134/24 |
| 3,856,570 | 12/1974 | McDermott et al. | 134/24 |
| 4,364,776 | 12/1982 | McBride et al. | 134/22.18 X |
| 4,376,702 | 3/1983 | Small | 210/258 X |

*Primary Examiner*—Robert L. Lindsay, Jr.
*Attorney, Agent, or Firm*—Schwartz & Weinrieb

[57] ABSTRACT

The sludge collecting in a floating roof type oil storage tank is disposed of by inserting a compressed liquid spurting device in a straightened state into the tank through an orifice in the floating roof, feeding compressed liquid to the spurting device, causing the spurting nozzle of the device to be swung about the device proper and, at the same time, releasing the compressed liquid against the sludge inside the tank thereby causing the sludge to be disintegrated and fludized by the force of the compressed liquid, and allowing the fludized sludge to be drawn into a reservoir whose interior is under negative pressure.

16 Claims, 11 Drawing Figures

METHOD FOR DISPOSAL OF SLUDGE IN FLOATING ROOF TYPE OIL TANK

FIELD OF THE INVENTION

This invention relates to a method for the disposal of sludge collecting within a floating roof type oil storage tank and to an apparatus used therefor. More particularly, this invention relates to a method for disposing of the sludge accumulated within a floating roof type oil storage tank by spurting a compressed liquid into the tank interior through liquid spurting devices provided with a flexible compressed liquid spurting cylinder and disposed on the supporting columns for the floating roof of the storage tank and to an apparatus for the spurting of compressed liquid.

FIELD OF THE INVENTION

When crude oil and other oils are stored for a long time in storage tanks, solid oil components thereof separate and accumulate in the form of sludge in the bottoms of the tanks. The sludge decreases the inner volume of the storage tank and interferes with maintenance and inspection of the tank interior and, therefore, must be removed from the tank interior.

In the disposal of sludge, when the amount of sludge so accumulated is small, as when the mound of sludge accumulated has not risen above the manholes provided in the lower portion of the lateral wall of the tank, for example, required removal of the accumulated sludge can be effected by first removing the oil from the tank interior, then opening the manholes, and introducing devices for the removal of sludge through the opened manholes into the tank interior. The removal of sludge by this method, however, becomes difficult when the mound of accumulated sludge rises above the manholes and the manholes can not be opened.

In this case, the ordinary method adopted for the disposal of sludge comprises heating the sludge by some means to a temperature exceeding the fluidifying temperature of the sludge and extracting the fluidified sludge out of the tank by means of a pump.

Recently, there have appeared large oil storage tanks having inner volumes ranging from 50,000 to 150,000 $m^3$. They at times suffer accumulation of as much as 20,000 to 50,000 kl of sludge in their interiors. For such large amounts of sludge to be heated to above the fluidifying temperature (50° to 70° C.), huge quantities of thermal energy and much heating time are required. The heating, therefore, is very costly. Besides, the heating must be continued over a long time and prevents the tank interior from use while the work is in process. Moreover, this work is not feasible in the absence of a suitable heat source.

A method designed to remove the sludge by inserting a flexible pipe into the tank interior, spurting compressed oil through the leading end of the pipe, and disintegrating the sludge by the force of the spurted compressed oil has been disclosed in Japanese Patent Application Disclosure No. SHO 54(1979)-140260, for example.

In accordance with this method, however, the direction in which the flexible pipe spurts the compressed oil is not stable. Since the disintegration of the sludge is not efficiently effected, the work involved is prolonged to a great extent. The requirement that the sludge should be thoroughly disposed of in a short period of time can hardly be fulfilled by this method.

Japanese Patent Application Disclosure No. SHO 56(1981)-84675 discloses a spurting nozzle of a construction such that the nozzle body is inserted into a floating roof type oil storage tank through an aperture in a support column for the floating roof and the terminal portion of the nozzle is revolved around the nozzle body.

SUMMARY OF THE INVENTION

The present invention has been proposed in view of the state of affairs mentioned above. When the sludge has accumulated to form a large mound inside the oil storage tank, this invention causes compressed liquid spurting devices provided with a bendable spurting cylinder and having a nozzle to be passed through some of numerous support column orifices of the floating roof and inserted to the depth of the tank interior, allows compressed liquid to be spurted through the nozzles against the mound of sludge to break, disperse, and dissolve the sludge by the force of the spurted compressed liquid and disintegrate the mound of sludge, and extracts the fluidized sludge in conjunction with the spent compressed liquid out of the tank through a pump.

BRIEF DESCRIPTION OF THE DRAWINGS

The other functions and characteristic features of this invention will become apparent from the further disclosure of the invention to be given hereinbelow with reference to the accompanying drawings, wherein.

DESCRIPTION OF THE PREFERRED EMBODIMENTS

Figure 1:
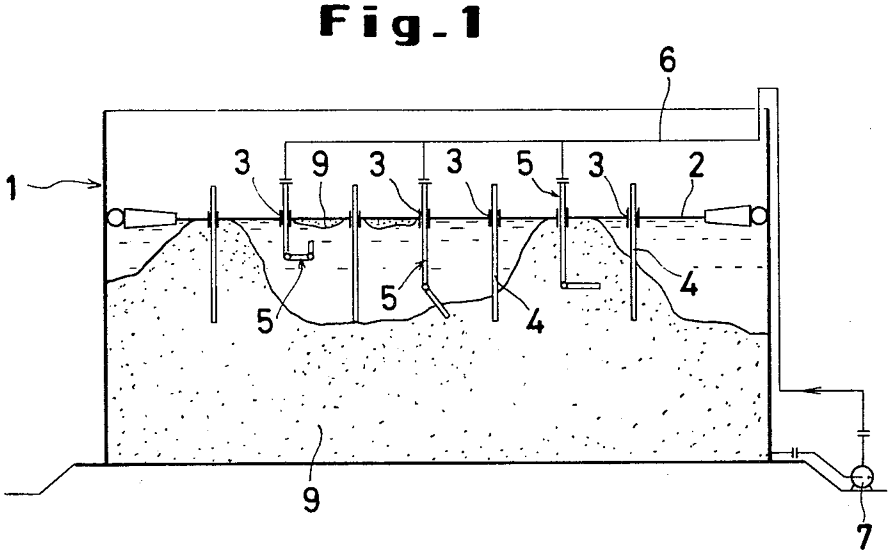
FIG. 1 is a cross section illustrating a typical condition of a floating roof type oil storage tank.

Now, the present invention will be described with reference to the embodiments shown in FIGS. 1 and 2. A floating roof 2 of a floating roof type oil storage tank 1 has a multiplicity of support column orifices 3 formed therein. Normally, support columns 4 of a fixed length are detachably inserted through the support column orifices 3.

In accordance with this invention, some of the support columns 4 are drawn out of the support column orifices depending on the shape of the tank 1 and/or the condition of the accumulation of sludge in the tank 1 and as many liquid spurting devices 5 as the removed support columns 4 are inserted through the open support column orifices. Thereafter, the liquid spurting nozzle portions of the liquid spurting devices 5 are turned in required directions within the tank interior. The liquid spurting devices are rotated in the horizontal direction about their respective axes and, at the same time, compressed liquid is spurted out of the nozzle tips. By the force of the spurted compressed liquid, the mound of sludge 9 is disintegrated and dissolved.

Figure 2:
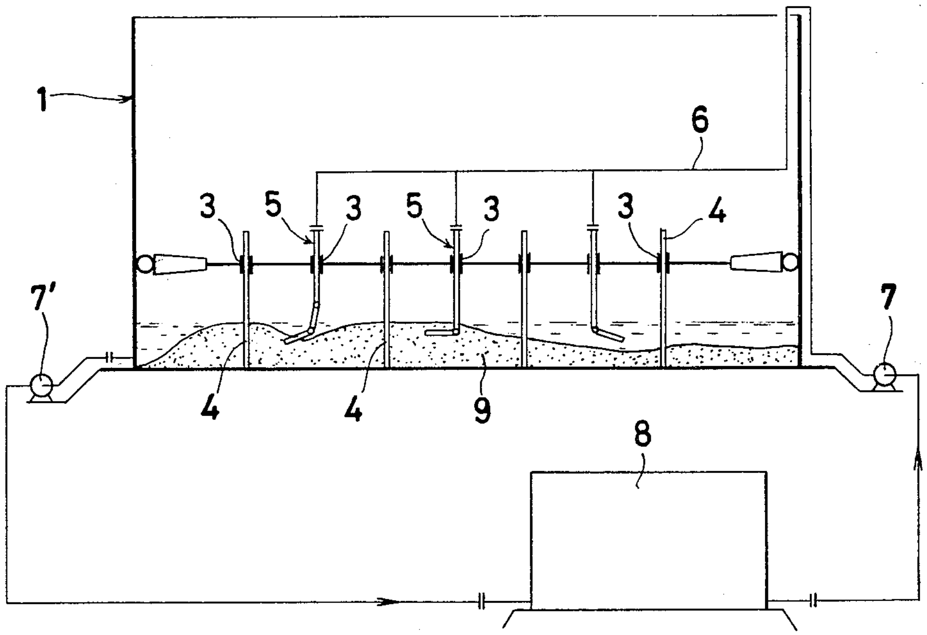
FIG. 2 is a cross section illustrating another typical condition of a floating roof type oil storage tank.
Figure 3:
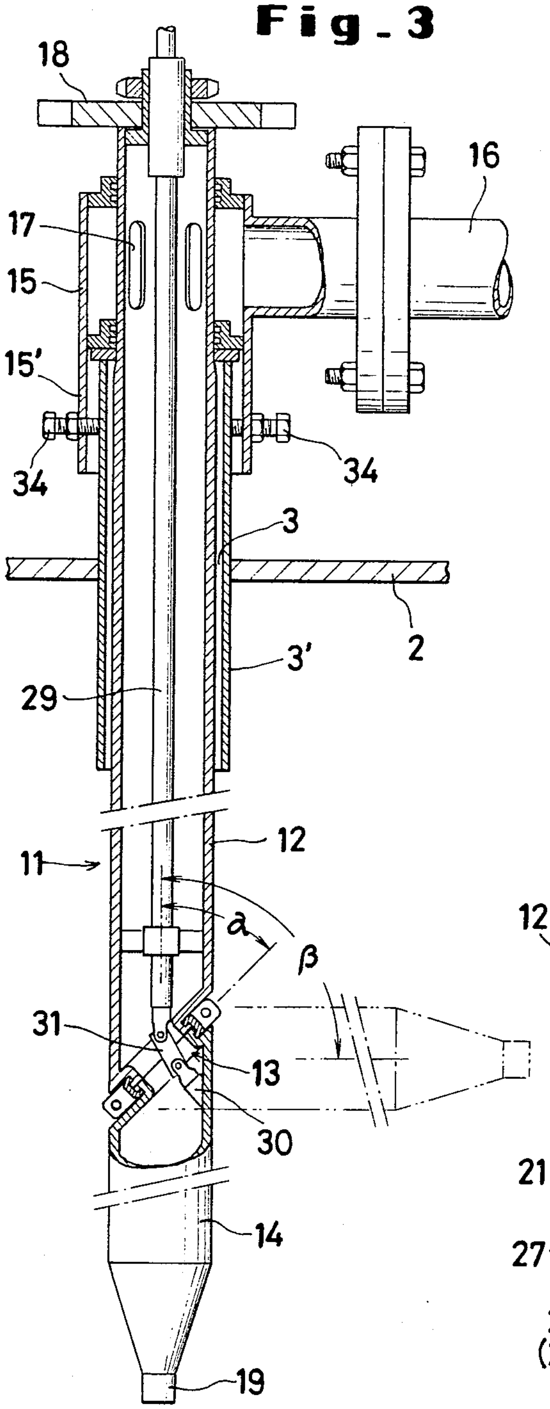
FIG. 3 is a cross section illustrating a first embodiment of the compressed liquid spurting device to be used in the present invention.

The floating roof 2 floats on the surface of oil when the height of the oil stored or the height of the mound of sludge accumulated is greater than the length of the support columns 4 (FIG. 1). When the height of the oil stored or the height of the mound of sludge accumulated is smaller than the length of the support columns 4, the floating roof 2 is fixed at a height equalling the length of the support columns 4 because it is supported in position by the support columns 4 which have reached the bottom of the tank. The floating roof 2 is never allowed to fall below the height of the support columns (FIG. 2).

When the fluid oil component is discharged from within the tank while the floating roof 2 is supported by the support columns against the bottom of the tank, the mound of sludge 9, which lacks fluidity, is exposed to the air within the tank interior.

The liquid spurting devices 5 which are intended to disintegrate and dissolve the sludge are used for spurting the compressed liquid as immersed in the oil when the floating roof 2 is floating on the surface of the oil. When the floating roof 2 has fallen to the height of the support columns and is retained by the support columns, the liquid spurting devices 5 are used for spurting the compressed liquid as held in the air or immersed in the sludge within the tank.

Even when the floating roof 2 is supported by the support columns against the bottom of the tank, the fluid oil component may be left unremoved from the tank interior and the liquid spurting devices 5 may be used as immersed in the oil.

The supply of compressed liquid to the liquid spurting devices 5 is effected through a pipe 6 by means of a pump 7. Otherwise, the liquid present in the tank 1 being cleaned may be cyclically used (FIG. 1). It is also permissible to use the liquid to be received from some other tank such as, for example a storage tank 8 (FIG. 2). Where the supply of the compressed liquid is effected by the latter method, the sludge which has been fluidized within the tank 1 may be discharged by a second pump 7' into the storage tank 8 at the same time that the liquid spurting devices 5 are normally operated.

Cold oil, heated oil, cold water, or hot water can be used as the liquid to be supplied to the liquid spurting devices 5. The kind of liquid to be used for this purpose is selected depending on various factors such as the kind of sludge, the amount of sludge, the auxiliary devices for the tank, and the like.

An embodiment wherein the nozzle end portions of the liquid spurting devices 5 are adapted to be bent in the shape of the letter "L" will be described with reference to FIGS. 3 to 6. A liquid spurting device 11 comprises a rotary cylinder 12 of a large length and a spurting cylinder 14 connected in the manner of a joint between two bones to the lower end of the rotary cylinder 12 through the medium of a connecting portion 13 and is adapted to be bent at the joint.

To the upper portion on the periphery of the rotary cylinder 12 is attached a liquid-tight stationary cylinder 15. To this stationary cylinder 15 is connected a feed pipe 16 for compressed liquid. The interior of the stationary cylinder 15 and the interior of the rotary cylinder 12 communicate with each other through a plurality of vertically oblong perforations 17 formed in the upper side of the cylinder 12. The aforementioned cylinder 12 is rotatable relative to the cylinder 15 by the operation of a flange 18 provided at the upper end of the rotary cylinder 12, for example.

The spurting cylinder 14 is provided at the leading end thereof with a spurting nozzle 19 for liquid. The basal end of the spurting cylinder 14 and the lower end of the rotary cylinder 12 are joined to each other through the medium of a joint 13 similar to a joint between two bones.

Figure 4:
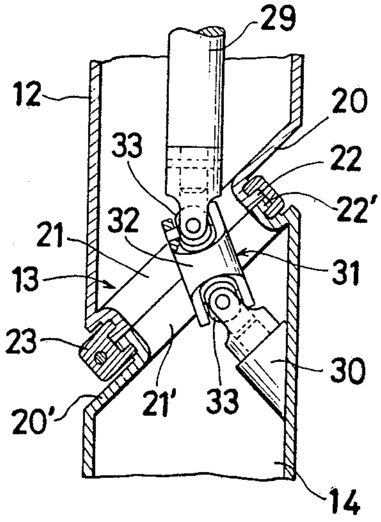
FIG. 4 is a cross section of a folding mechanism of the spurting device of FIG. 3 with the device held in the form of a straight tube.
Figure 5:
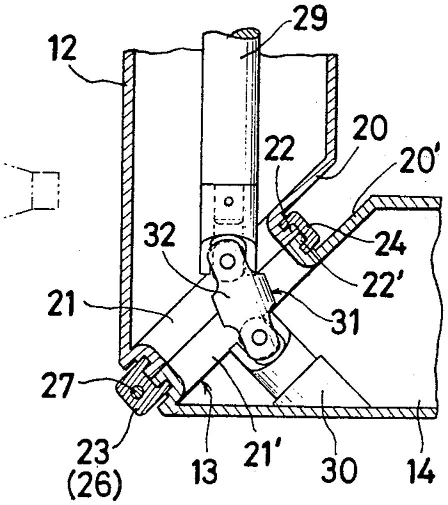
FIG. 5 is a cross section of the folding mechanism of the spurting device of FIG. 3 with the device held in a bent form.

Specifically, this joint 13 is constructed, as illustrated in FIG. 4 and FIG. 5, by providing the lower end of the rotary cylinder 12 and the base end of the spurting cylinder 14 respectively with closing portions 20, 20' which are slanted relative to the axial directions of the cylindrical portions, providing the closing portions 20, 20' respectively with outwardly protruding short annular portions 21, 21', and allowing flange-like end face portions 22, 22' formed at the leading edges of the annular portions 21, 21' to abut against each other and to be rotatably supported on each other. Since the surfaces of the end face portions 22, 22' are slanted similarly to the slanted closing portions 20, 20', the rotary cylinder 12 is rotated on the joint 13 as its base, depending on the condition of the inclination of the end face portion (closing portion) thereof when the end face portion 22' of the spurting cylinder 14 is rotated about itself on the end face portion 22 of the rotary cylinder 12 while keeping intimate face-to-face sliding contact with the end face portion 22. The rotary cylinder 12 and the spurting cylinder 14, therefore, are allowed to define a straight passage as illustrated in FIG. 4 or a bent passage as illustrated in FIG. 5.

In the construction described above, when the end face portion 22 is slanted by an angle of $\alpha$ degrees (45°) relative to the axial direction of the rotary cylinder 12 and the end face portion 22' is slanted similarly, the spurting cylinder 14 can be bent up to an angle of $\beta$ degrees (90°) relative to the rotary cylinder 12. If the angle $\alpha$ is 30°, then the angle $\beta$ is 60°. In this case, therefore, the spurting cylinder 14 can be bent up to an upwardly slanted direction.

Figure 6:
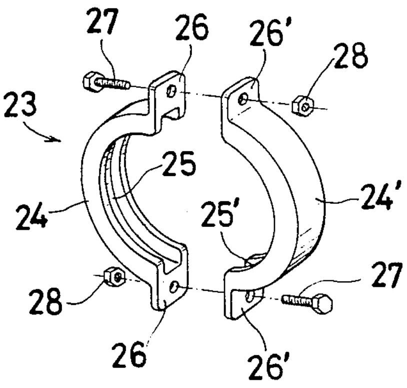
FIG. 6 is an exploded perspective view of the frame member for the aforementioned folding mechanism.

The rotary cylinder 12 and the spurting cylinder 14 are connected to each other by having a retaining ring 23 fitted around the intimately aligned outer peripheries of the two end face portions 22, 22'. This retaining ring 23 is formed of two symmetrically opposed semicircular frames 24, 24' as illustrated in FIG. 6. In the inner faces of the semicircular frames 24, 24', are provided grooves 25, 25' just wide enough for admitting the intimately aligned peripheries of the end portions 22, 22'. The frames are provided at the ends thereof with outwardly protruding fastening pieces 26, 26'. The rotary cylinder 12 and the spurting cylinder 14 are watertightly and rotatably connected to each other with their interiors allowed to communicate with each other by abutting the end face portions of the two cylinders, then fitting the frames 24, 24' in the lateral direction onto the aligned peripheries of the end face portions thereby allowing the peripheries to be set in the grooves 25, 25', passing bolts 27 through the opposed fastening pieces 26, 26', and tightening nuts 28 onto the bolts 27.

In the construction described above, desired rotation of the spurting cylinder 14 can be effected by rotating an operating rod 29 axially passed through the interior of the rotary cylinder 12. The upper end of this operating rod 29 protrudes from the upper end of the rotary cylinder 12 so that the operating rod 29 may be rotated by means of a handle (not shown) attached to the protruding leading end thereof. The lower end of this operating rod 29 reaches the joint 13. The spurting cylinder 14 is provided on the inner wall thereof with a slanted stationary rod 30 extended as far as the joint 13. The lower end of the operating rod 29 and the leading end of the stationary rod 30 are connected to each other through the medium of a flexible joint 31. In the illustrated embodiment, this flexible joint 31 has one end of a connecting member 32 pivotally attached to the lower end of the operating rod 29 and the other end of the connecting member 32 similarly attached to the leading end of the stationary rod 30 respectively through the medium of a rotary element 33. A rotation of the operating rod 29 imparts a rotation to the connecting member 32 and consequently an inclination to the stationary rod 30, with the result that the spurting cylinder 14 rotates in the direction of assuming an inclined position while keeping face-to-face sliding contact between the two end face portions 22, 22'. By the rotation of the operating rod 29, therefore, the spurting cylinder 14 can be rotated to any desired angle relative to the rotary cylinder 12 to form a straight passage or a perpendicularly bent passage at the joint. No matter what position the spurting cylinder 14 may be caused to assume relative to the rotary cylinder 12, the interior of the rotary cylinder 12 and that of the spurting cylinder 14 continue to communicate with each other.

The flexible joint 31 illustrated above is just one example. A coupling of any construction can be used instead on condition that a rotation of one of the two rods of the coupling should cause a change in the angle of the other rod. Examples of couplings satisfying this requirement are an elastic coupling formed of coil springs of powerful tension and a pin coupling having pins slidably fitted in grooved holes.

Now, an embodiment of the liquid spurting device which has a spurting nozzle portion thereof adapted so as to be bent in the shape of the letter "U" will be described with reference to FIG. 7 through FIG. 10. Outwardly, this device comprises a control box 41, a stationary cylinder 42 of a large length extended downwardly from the control box 41, a rotary cylinder 43 rotatably suspended from the lower end of the stationary cylinder 42, a folding cylinder 44 adapted to assume a bent form by being rotated relative to the rotary cylinder 43, and a spurting cylinder 45 adapted to assume a bent form by being rotated relative to the folding cylinder 44. The lower end of the spurting cylinder 45 forms a spurting nozzle 46.

Figure 8:
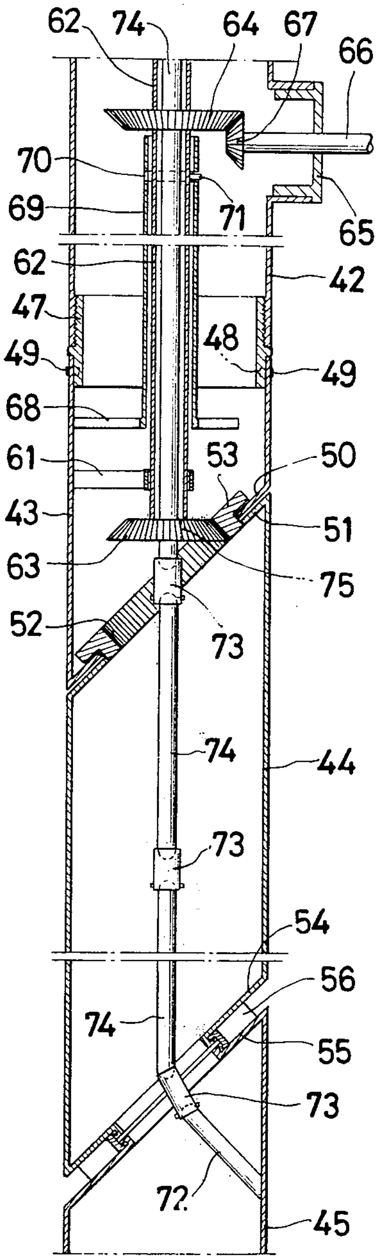
FIG. 8 is an enlarged cross section of the essential part of the spurting device of FIG. 7.

The joints between the adjacent cylinders of the device will be described with reference to FIG. 8. On the inner wall of the lower end of the stationary cylinder 42, a female thread is cut. Into this female thread is helically fitted a male thread formed at the upper end of a connecting sleeve 47. Through the union between the two threads, the connecting sleeve 47 is intimately joined with the stationary cylinder 42. In the lower portion of the connecting sleeve 47, an annular pin groove 48 is incised. Into this pin groove 48, pins 49 are inserted from outside the rotary cylinder 43. The rotary cylinder 43, therefore, is freely rotatable relative to the stationary cylinder 42.

The lower end of the rotary cylinder 43 constitutes a slanted end face portion 50 which is inclined by 45 degrees from the axial direction of the cylinder. This end face portion 50 abuts a slanted end face portion 51 formed at the upper end of the folding cylinder 44 as inclined by 45 degrees, for example, from the axial direction of the cylinder. An internal gear 52 is set fast in the slanted end face portion 51 on the folding cylinder 44 side. An outer flange 53 formed on the upper side of the internal gear 52 embraces the slanted end face portion 50 on the rotary cylinder 43 side and rotatably supports the rotary cylinder 43 and the folding cylinder 44. When a relative rotation is imparted between the rotary cylinder 43 and the folding cylinder 44 while the two cylinders are held together in a straight line, the folding cylinder 44 is bent because of the inclination of the end face portions 50, 51. After the angle of relative rotation between the two cylinders reaches 180°, the two cylinders assume the shape of the letter "L".

The joint between the folding cylinder 44 and the spurting cylinder 45 is similar to that between the rotary cylinder 43 and the folding cylinder 44. A slanted end face portion 54 at the lower end of the folding cylinder 44 abuts a slanted end face portion 55 of the spurting cylinder 45, and the two cylinders are rotatably joined to each other through the medium of a joint 56.

Now, the mechanism which enables the folding cylinder 44 to be folded relative to the rotary cylinder 43 will be described. Along the axes of the rotary cylinder 42 and the rotary cylinder 43, there is disposed an inner driving cylinder 62 having the upper end thereof reaching the control box 41 and the lower end thereof rotatably supported by a support member 61 protruding from the inner surface of the rotary cylinder 43. To the lower end of this inner driving cylinder 62 is fastened a bevel gear 63 meshed with the aforementioned internal gear 52. In the upper portion of the inner driving cylinder 62, a bevel gear 64 is similarly fastened. This bevel gear 64 is meshed with a small bevel gear 67 which supports a rod 66 retractably on the operation box 65.

Figure 10:
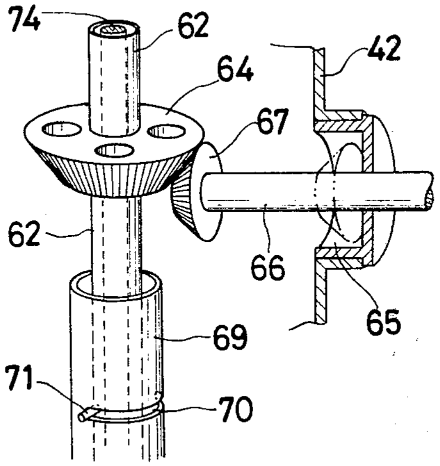
FIG. 10 is a perspective view illustrating the essential part of the folding mechanism of the spurting device of FIG. 7.
Figure 9:
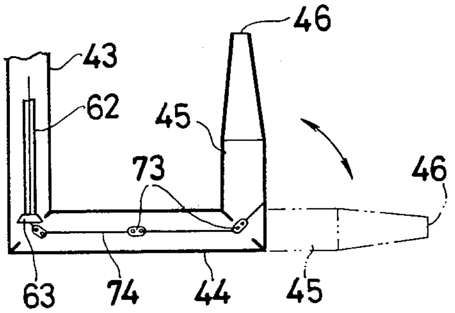
FIG. 9 is an explanatory diagram illustrating the spurting device of FIG. 7 as held in a bent form.

The rotary cylinder 43 is integrally provided with an inner driven cylinder 69 through the medium of a plurality of radial arms 68. This driven cylinder 69 is disposed outside the inner driving cylinder 62. In part of the periphery thereof, a pin groove 70 is incised over an angle of 180° in the circumferential direction (horizontal direction). In this pin groove 70, a pin 71 projected from the inner driving cylinder 62 is fitted. The inner driving cylinder 62, therefore, is freely rotatable relative to the inner driven cylinder 69 until the pin 71 reaches the ends of the pin groove 70. After the pin 71 has collided with the end of the pin groove 70, the inner driving cylinder 62 rotates together with the inner driven cylinder 69 (FIG. 10).

From the inner wall of the spurting cylinder 45, a stationary rod 72 is projected. This stationary rod 72 is connected to a rotary rod 74 which is connected through the medium of a flexible joint 73. The rotary rod 74 is passed through the axial hole 75 of the bevel gear 63 and the center of the inner driving cylinder 62, led into the control box 41, and rotationally driven by a drive mechanism formed inside the control box 41. The inner driving cylinder 62 is similarly driven rotationally by a drive mechanism formed inside the control box 41 separately of the small bevel gear 67 of the operation box 65. The two drive mechanisms are driven by a turbine 77 provided in the path 76 for feeding compressed liquid to the stationary cylinder 42.

Now, the operation of the device of the foregoing construction in the discharge of the sludge 9 accumulating within the floating roof type oil storage tank 1 and adhering to the lower surface of the floating roof 2 will be described below. In the device of the first embodiment, pairs of a rotary cylinder 12 and a spurting cylinder 14 kept in the shape of a straight rod are inserted through support column orifices 3 formed in the floating roof 2 until the fitting frames 15' extended outwardly from the stationary cylinder 15 are fitted over the cylindrical portions 3' of the support column orifices 3 and, subsequently, the lock bolts 34 are inserted from outside the fitting frames 15' and tightened up against the outer surfaces of the cylinders. At this stage, the rotary cylinder 12 and the spurting cylinder 14 hang down from the floating roof 2 into the interior of the oil storage tank 1. So, the spurting cylinder 14 are bent to suitable angles relative to the rotary cylinder 12 by the rotation of the operating rods 29. After the liquid spurting devices 11 have been suitably attached to the support column orifices as described above, liquid is forwarded in a compressed state through the feed pipe 16 to the interiors of the rotary cylinder 12 and forcibly spurted out of the spurting nozzles 19. During the spurting of the compressed liquid through the spurting nozzles 19, the rotary cylinder 12 are rotated at a low speed. Consequently, the spurting nozzles 19 spurt the compressed liquid and, at the same time, gyrate in the horizontal direction. By the force of the spurted compressed liquid, the sludge within the tank is disintegrated and dissolved in a fluidized state. The fluidized mixture of sludge and liquid is discharged out of the tank by the pump 7'.

In the device of the second embodiment in which the nozzle portion is adapted to be folded in the shape of the letter "U", sets of a stationary cylinder 42, a folding cylinder 44, and a spurting cylinder 45 kept in the shape of a straight rod are inserted through support column orifices 3 formed in the floating roof 2, then small bevel gears 67 in operating boxes 65 are inserted in conjunction with rods 66 and meshed with bevel gears 64, and thereafter the aforementioned bevel gears 67 are rotated. The inner driving cylinders 62 and the bevel gears 63 are simultaneously rotated, with the result that the folding cylinders 44 which incorporate the internal gears 52 adapted to be meshed with the bevel gears 63 will be rotated relative to the rotary cylinders 43. As the inner driving cylinders 62 are rotated by 180° while the rotary cylinders 43 and the folding cylinders 44 are still in the shape of a straight rod, the folding cylinders 44 are bent to right angles relative to the rotary cylinders owing to the action of slanted end face portions 50, 51. During this operation, the pins 71 which protrude from the inner driving cylinders 62 move along the pin grooves 70 formed on the inner driven cylinders 69. Consequently, the inner driven cylinders and the rotary cylinders 43 are not rotated.

After the individual cylinders of the devices have been set to the position indicated above, the small bevel gears 67 are pulled out of engagement with the bevel gears 64 and, subsequently, compressed liquid is supplied to the feed paths 76. The liquid flows inside the stationary cylinders 42 and the force exerted by the flow of this liquid causes the turbines 77 to rotate, with the result that the inner driving cylinders 62 and the rotary rods 74 are rotated. As the pins 71 of the inner driving cylinders 62 have already reached the ends of the pin grooves 70, the rotation of the inner driving cylinders 62 causes the inner driven cylinders 69 to move simultaneously. As a result, the rotary cylinders 43 are rotated relative to the stationary cylinders 42 and the folding cylinders 44 are rotated around the stationary cylinders 42 as retained in the perpendicularly bent state by the rotary cylinders 43. Owing to the engagement between the bevel gears 63 and the internal gears 52, the folding cylinders 44 are caused to rotate simultaneously with the rotary cylinders 43. They are allowed to retain the perpendicularly bent state because they produce no motion relative to the rotary cylinders 43.

In the meantime, the rotation of the rotary rod 74 is transmitted through the flexible joint 73 and the stationary rod 72 and finally delivered to the spurting cylinder 45. Since the spurting cylinder 45 and the folding cylinder 44 are joined to each other through the medium of their respective slanted end face portions 54, 55 and they produce a relative rotation with reference to each other, the spurting cylinder 45 repeats a swinging motion of assuming a perpendicular position with reference to the folding cylinder 44 and subsequently resuming a straightened position. From the overall point of view, therefore, the series of the cylinders continues to spurt the compressed liquid through the spurting nozzle 46 of the spurting cylinder 45 while keeping the individual cylinders rotated so as to form alternately the shapes of the letters "L" and "U". The liquid thus spurted disintegrates and dissolves the sludge deposited within the oil storage tank and particularly that adhering to the inner face of the floating roof 2, with the result that the sludge is fluidized. The fluidized sludge is discharged out of the tank by the pump 7.

In the embodiment so far described, the slanted end face portions 50, 51 serving to join the rotary cylinder 43 and the folding cylinder 44 and the slanted end face portions 54, 55 serving to join the folding cylinder 44 and the spurting cylinder 45 are inclined by 45° relative to the axial direction. Thus, the individual cylinders are bent to the maximum of 90°. Obviously, the maximum angle with which the cylinders can be bent varies with the angle of inclination of the slanted end faces of the cylinders. The parts which are used within the cylinders are desired to be as small as possible in order to secure an ample cross-sectional area for the passage of the compressed liquid. Particularly, it is desirable to perforate the bevel gears 63, 64 to the fullest extent within which loss of strength is not caused.

When the work for the removal of sludge described above is completed, the spurting of compressed liquid is stopped and the cylinders are straightened out and drawn out of the support column orifices 3.

Now, the method by which the mixed liquid produced within the tank in consequence of the disintegration and dissolution of sludge by the force of the spurted compressed liquid is effectively discharged out of the tank will be described.

The liquid collecting in the bottom of the tank, namely the mixture of the liquid resulting from the disintegration or dissolution of sludge with the spurted liquid is desired to be discharged as soon as possible.

This is because the effect of the pressure of the spurted liquid upon the disintegration and dissolution of sludge decreases when the sludge remains immersed in the mixed liquid and notably increased when the sludge is exposed to the ambient air. If the liquid collecting in the tank is slowly discharged, the sludge becomes soaked in the liquid.

Heretofore, the discharge of the mixed liquid has been effected by inserting a suction pipe connected to a pump through the manhole of the tank, for example, until the leading end of the suction pipe reaches the bottom of the tank, and driving the pump so as to remove the mixed liquid by means of suction from the tank interior. By this method, however, solids such as the sludge and the rust from the bottom of the tank enter the motor and degrade the operating efficiency of the pump and, in an extreme case, cause breakage of the pump. When the level of the mixed liquid falls within the tank, the leading end of the suction pipe may possibly expose itself to the ambient air in the tank and the pump consequently sucks air. Once air is sucked by the pump, the pump requires priming. Even in the case of a self-suction pump, once the air suction occurs, the pump requires a very long time before it starts sucking the mixed liquid again. Since the capacity of the pump for sucking the mixed liquid from within the tank is lowered by the air suction, the effect of the removal of the mixed liquid is notably degraded.

Figure 11:
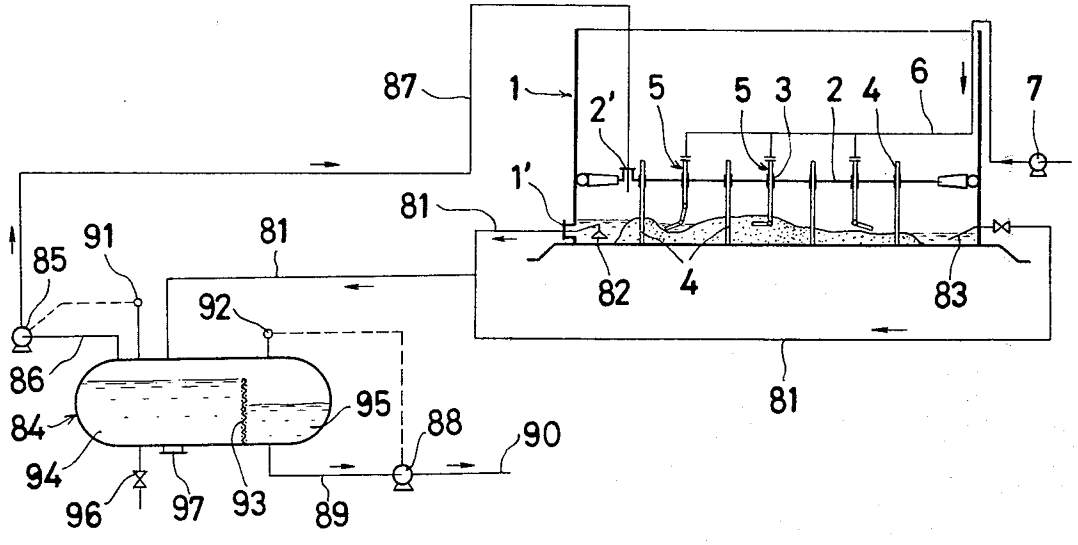
FIG. 11 is an explanatory diagram illustrating a typical method for the disposal of the sludge collecting in the floating roof type oil storage tank by the device of the present invention.
Figure 7:
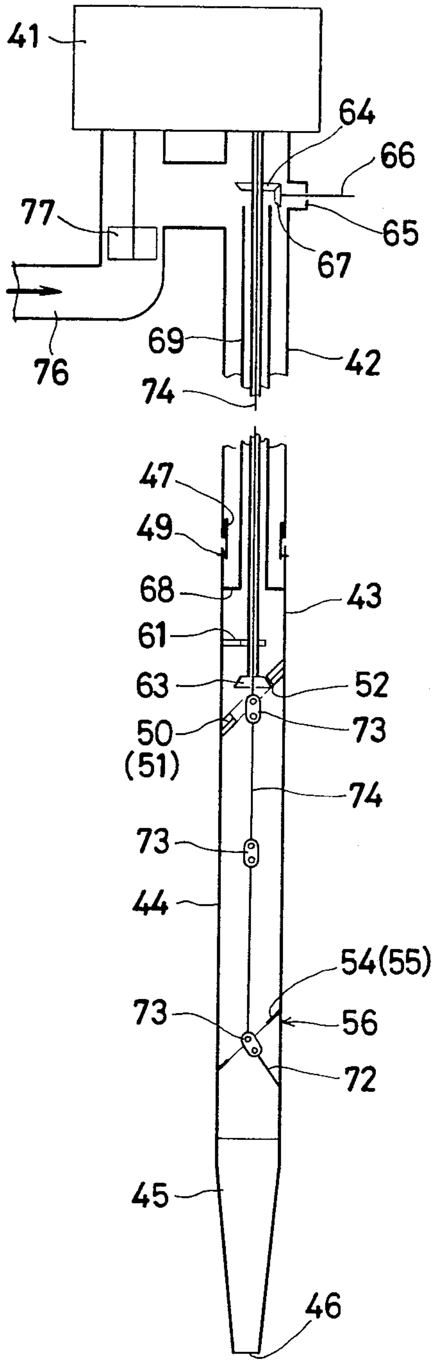
FIG. 7 is a schematic cross section illustrating a second embodiment of the compressed liquid spurting device to be used in the present invention.

To preclude the disadvantage, this invention effects the removal of the mixed liquid from within the tank by inserting the suction inlet of a suction pipe into the tank interior, connecting the outer end of the pipe to a liquid reservoir, and causing the mixed liquid to be extracted by the suction which is caused by the negative pressure of the liquid reservoir. This removal of the mixed liquid will be described specifically with reference to FIG. 11.

A flow pipe 81 for discharging the mixed liquid from within the tank 1 is passed through the manhole 1' into the tank interior. The suction inlet 82 provided at the leading end of the flow pipe 81 is opposed to the inner surface of the bottom of the tank 1 or the flow pipe 81 is connected to a drain nozzle 83 provided in the tank 1. The basal end of the flow pipe 81 is connected to the upper side of an airtight reservoir 84. The reservoir 84 has a suction pipe 86 of a gas suction pump 85 connected to the upper side thereof. A discharge pipe 87 of the gas suction pump 85 is passed through a roof manhole 2' or a manhole (not shown) into the interior of the tank 1. To the reservoir 84 is connected a suction pipe 89 which is connected to the suction side of a liquid suction pump 88. A discharge pipe 90 of this suction pump 88 is connected to a transfer reservoir (not shown), for example.

When the gas suction pump 85 is set operating, negative pressure develops in the interior of the reservoir 84 and suction occurs at the suction inlet 82 and the drain nozzle 83, with the result that the liquid collecting in the bottom of the tank is sucked through the flow pipe 81 into the reservoir 84. When the liquid in the reservoir 84 is discharged through the suction pipe 89 by the operation of the suction pump 88, the pressure inside the reservoir 84 becomes negative because of the action of the gas suction pump 85. The liquid in the tank 1, therefore, can be continuously sucked out and poured into the reservoir 84.

Since the sludge deposited within the tank 1 is disintegrated and dissolved by the highly compressed washing liquid spurted out of the spurting devices 5 and the liquid resulting from the disintegration and dissolution of sludge and the spent washing liquid are sucked into the reservoir 84 by the negative pressure developed in the reservoir 84 as described above, the negative pressure within the reservoir is maintained by the operation of the gas suction pump 85 and the efficiency of liquid suction is not lowered even when the liquid level in the tank 1 is lowered and the air within the tank is sucked through the suction inlet 82 and the drain nozzle 83.

When the sludge collecting within the tank 1 is disintegrated and dissolved by use of a jet blower, the tank is filled with inert gas to keep an inert atmosphere in the tank and preclude otherwise possible explosion from occuring in the tank interior due to static electricity. When the inert gas is sucked out of the tank interior, therefore, there ensues a possibility that the ambient air will flow into the tank interior through some opening or other to increase the oxygen concentration of the interior gas and, in consequence of the change in the gas composition, the inert atmosphere in the tank will no longer be retained. In the present embodiment, however, since the discharge pipe 87 of the gas suction pump 85 opens into the interior of the tank 1, no change in the gas composition is caused because the gas, when sucked out via the suction inlet 82 or drain nozzle 83, is immediately returned to the tank 1. Thus, the oxygen concentration in the inert atmosphere within the tank 1 is not made to rise. Since all the gas sucked out of the tank interior is wholly returned into the tank, the atmosphere within the tank remains intact. The inert gas composing the atmosphere and the gas issuing from the oil stored in the tank are not diffused into the ambient air of the tank. Consequently, the possibility of odors finding their way into the ambient air and of explosions occurring outside the tank is precluded. Optionally the discharge pipe 90 of the liquid suction pump 88 described above may be connected via the transfer tank to the pump 7 serving to feed a liquid to the spurting device 5. This connection can be utilized for the cyclic use of the liquid because the spent liquid in the tank 1 may be drawn and collected in the reservoir 84 and subsequently spurted out as compressed through the spurting device 5.

In the illustrated embodiment, a pressure gauge 91 and a liquid level gauge 92 are disposed opposite the reservoir 84, with the pressure gauge 91 connected to the air suction pump 85 and the liquid level gauge 92 to the liquid suction pump 88 respectively either electrically or pneumatically. The pressure gauge 91 is adapted to detect the rise of the interior pressure of the reservoir 84 to a prescribed level and turn ON or OFF the air suction pump 85 and the liquid level gauge 92 is adapted to detect the rise of the liquid level in the reservoir 84 to a prescribed height and turn ON or OFF the liquid suction pump 88.

Since the inner pressure and the liquid volume of the reservoir 84 can be constantly controlled by means of the pressure gauge 91 and the liquid level gauge 92, the work for the removal of the liquid collecting within the tank 1 can be automated. Further, the interior of the reservoir 84 is partitioned into a first chamber 94 and a second chamber 95 by a net member 93. The liquid from the flow pipe 81 is admitted into the first chamber 94. When the liquid of the first chamber 94 overflows the chamber 94 or flows through the net member 93, it collects in the second chamber 95. The liquid thus collecting in the second chamber 95 is drawn out by the liquid suction pump 88. In this construction of the reservoir, if the liquid flowing from the flow pipe 81 into the reservoir 84 happens to contain solid particles such as of metal, such solid particles settle to the bottom of the first chamber 94 and, therefore, are prevented from being delivered to the liquid suction pump 88. Since only the liquid is recovered by the pump 88, the pump is neither clogged nor broken, the liquid forwarded to the tank does not entrain any solid particles. The solid particles which have been deposited on the bottom of the first chamber 94 can be removed through a drain 96 or a manhole 97 while the work is suspended.

As is clear from the description given above, the present invention accomplishes desired removal of the sludge accumulating within the floating roof type oil storage tank by inserting liquid spurting devices as held each in the form of a straight tube into the tank interior through the orifices of support columns for the floating roof, fixing the liquid spurting nozzles of the spurting devices in stated directions, revolving the spurting nozzles around the respective devices and, at the same time, spurting compressed liquid through the nozzles, and causing the sludge inside the tank to be broken, dispersed, dissolved, and disintegrated by the force of the spurted compressed liquid. The sludge, therefore, is fluidized very efficiently. By this method, therefore, the removal of the sludge can be effected quickly even in an oil storage tank of very large inner volume. Since the work does not require use of any heat source, it minimizes economic loss. The liquid spurting device can be automatically rotated by a hydraulic motor which is adapted to be driven by a hydraulic pump adapted to be rotated by a turbine using as its drive source the force exerted by the compressed liquid flowing through the device interior.

Further in accordance with this invention, since the spurting nozzles are positioned as separated from the apertures of the support columns, the operating ranges of the nozzles are large enough even for the portions of sludge separated greatly from the orifices of the support columns to be completely disintegrated by the compressed spurted liquid. Thus, the intervals separating the liquid spurting devices can be increased in length and the number of the liquid spurting devices can be decreased proportionally. The method of the present invention, therefore, enables the sludge collecting in any form or even to a great height reaching the inner surface of the floating roof to be quickly and completely disintegrated, fluidized, and removed out of the tank. Since the liquid spurting devices can be attached or detached from above the floating roof, they enjoy great convenience of handling.

What is claimed is:

1. A method for the disposal of sludge collecting within a tank, comprising the steps of:

mounting at least one pressurized liquid spurting device, comprising at least two relatively movable members, within said tank;

selectively moving one of said at least two relatively movable members relative to said other one of said at least two relatively movable members so as to selectively change the geometrical configuration of said spurting device and thereby the application angle of said pressurized liquid relative to said collecting sludge;

spurting said pressurized liquid from said spurting device onto said collecting sludge within said tank so as to thereby disintegrate and fluidize said sludge; and removing said disintegrated and fluidized sludge from said tank.

2. A method for the disposal of sludge collecting within a tank, comprising the steps of:

mounting at least one pressurized liquid spurting device within said tank;

selectively moving said liquid spurting device within any one of three different mode movements within said tank and relative to said collecting sludge;

spurting said pressurized liquid from said spurting device onto said collecting sludge within said tank so as to thereby disintegrate and fluidize said sludge; and removing said disintegrated and fluidized sludge from said tank.

3. A method for the disposal of sludge collecting within a tank, comprising the steps of:

mounting at least one pressurized liquid spurting device, comprising at least two relatively bendable members, within said tank;

selectively bending one of said at least two relatively bendable members relative to said other one of said at least two relatively bendable members so as to selectively change the geometrical configuration of said spurting device and thereby the application angle of said pressurized liquid relative to said collecting sludge;

spurting said pressurized liquid from said spurting device onto said collecting sludge within said tank so as to thereby disintegrate and fluidize said sludge; and removing said disintegrated and fluidized sludge from said tank.

4. A method as set forth in claim 1, further comprising:

fluidically connecting said tank to a reservoir;

maintaining the interior of said reservoir under negative pressure; and removing said disintegrated and fluidized sludge from said tank into said reservoir under the influence of said negative pressure maintained within said reservoir.

5. A method as set forth in claim 1, wherein:

said at least two relatively movable members are moved relative to each other to any one of various positions between and including two extreme geometrical configurations comprising relatively co-axial in-line and relatively perpendicular L-shaped configurations.

6. A method as set forth in claim 1, wherein:

said at least one pressurized liquid spurting device comprises three relatively movable members; and said three movable members are moved relative to each other to any one of various positions between and including two extreme geometrical configurations comprising relatively co-axial in-line and relatively U-shaped configurations.

7. A method as set forth in claim 1, wherein:

said tank is a floating roof type oil storage tank; and said at least one pressurized liquid spurting device is mounted upon said floating roof of said tank.

8. A method as set forth in claim 7, further comprising:

mounting a plurality of pressurized liquid spurting devices upon said floating roof of said tank.

9. A method as set forth in claim 4, further comprising the steps of:

separating said fluidized sludge within said reservoir into liquid and sludge components;

recirculating said liquid component from said reservoir back into said tank through said pressurized liquid spurting device; and removing said sludge from said reservoir.

10. A method as set forth in claim 2, wherein:

said three different mode movements comprises a translational mode movement along a first axis of said device, a rotational mode movement about said first axis, and a rotational mode movement about a second axis intersecting said first axis whereby said liquid spurting device achieves translational, rotational, and angular movements relative to said first axis.

11. A method as set forth in claim 2, comprising:

said at least one pressurized liquid spurting device comprises at least two relatively movable members; and said at least two relatively movable members are moved relative to each other to any one of various positions between and including two extreme geometrical configurations comprising relatively co-axial in-line and relatively perpendicular L-shaped configurations.

12. A method as set forth in claim 2, wherein:

said at least one pressurized liquid spurting device comprises three relatively movable members; and said three movable members are moved relative to each other to any one of various positions between and including two extreme geometrical configurations comprising relatively co-axial in-line and relatively U-shaped configurations.

13. A method as set forth in claim 2, wherein:

said tank is a floating roof type oil storage tank; and said at least one pressurized liquid spurting device is mounted upon said floating roof of said tank.

14. A method as set forth in claim 13, further comprising:

mounting a plurality of pressurized liquid spurting devices upon said floating roof of said tank.

15. A method as set forth in claim 2, further comprising:

fluidically connecting said tank to a reservoir;

maintaining the interior of said reservoir under negative pressure; and removing said disintegrated and fluidized sludge from said tank into said reservoir under the influence of said negative pressure maintained within said reservoir.

16. A method as set forth in claim 15, further comprising:

separating said fluidized sludge within said reservoir into liquid and sludge components;

recirculating said liquid component from said reservoir back into said tank through said pressurized liquid spurting device; and removing said sludge from said reservoir.

* * * * *